(12) United States Patent
Ishii

(10) Patent No.: US 7,869,815 B2
(45) Date of Patent: Jan. 11, 2011

(54) LOCATION SYSTEM WITH ENHANCED SECURITY

(75) Inventor: Kenichi Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 358 days.

(21) Appl. No.: 10/365,555

(22) Filed: Feb. 13, 2003

(65) Prior Publication Data

US 2003/0153310 A1  Aug. 14, 2003

(30) Foreign Application Priority Data

Feb. 13, 2002  (JP) ............................ 2002-034796

(51) Int. Cl.
*H04W 24/00* (2009.01)
*H04M 1/66* (2006.01)
*H04W 4/00* (2009.01)

(52) U.S. Cl. .............. 455/456.2; 455/456.1; 455/456.6; 455/411; 455/433

(58) Field of Classification Search .............. 455/456.1, 455/456.2, 456.3, 456.4, 456.5, 456.6, 433, 455/411, 410, 414.2
See application file for complete search history.

(56) References Cited

U.S. PATENT DOCUMENTS

| | | | |
|---|---|---|---|
| 6,138,003 A | 10/2000 | Kingdon et al. | |
| 6,195,557 B1 * | 2/2001 | Havinis et al. ........... | 455/456.2 |
| 6,360,102 B1 * | 3/2002 | Havinis et al. ............. | 455/457 |
| 6,463,288 B1 * | 10/2002 | Havinis et al. ........... | 455/456.1 |
| 6,463,289 B1 * | 10/2002 | Havinis et al. ........... | 455/456.4 |
| 6,687,504 B1 * | 2/2004 | Raith ...................... | 455/456.1 |
| 7,031,722 B2 | 4/2006 | Naghian | |
| 7,269,428 B1 | 9/2007 | Wallenius et al. | |
| 2002/0077119 A1 * | 6/2002 | Fitch et al. .................. | 455/456 |
| 2002/0086682 A1 | 7/2002 | Naghian | |

FOREIGN PATENT DOCUMENTS

| | | |
|---|---|---|
| EP | 1 158 826 | 11/2001 |
| JP | 10-281801 | 10/1998 |
| JP | 2001-78273 | 3/2001 |

(Continued)

OTHER PUBLICATIONS

3GPP Technical Specification 23.271 V5.1.0, "Functional stage 2 description of LCS", Dec. 2001 (Document 1).

(Continued)

*Primary Examiner*—Un C Cho
(74) *Attorney, Agent, or Firm*—Young & Thompson

(57) ABSTRACT

In a location system, gateways maintain privacy settings of mobile terminals. On receiving a location request from a client terminal, each gateway determines which of the gateways maintains the privacy settings of a target mobile terminal specified in the request, and transmits the location request to a gateway if the latter maintains the privacy settings of the specified target mobile terminal. The gateway performs a first privacy check on a location request received either from the client terminal or from other gateway using the privacy settings of the target mobile terminal, transmits the request to a positioning system to obtain a measurement result indicating the location of the target mobile terminal if the request conforms to the privacy settings, and performs a second privacy check on the measurement result using the privacy settings. A result of the second privacy check is then communicated to the client terminal.

9 Claims, 16 Drawing Sheets

FOREIGN PATENT DOCUMENTS

| | | |
|---|---|---|
| JP | 2001-103537 | 4/2001 |
| JP | 2001-359169 | 12/2001 |
| JP | 2002-507105 | 3/2002 |
| WO | 99/27722 | 6/1999 |
| WO | 99/55115 | 10/1999 |
| WO | 00/69199 | 11/2000 |
| WO | 00/76171 | 12/2000 |
| WO | 01/39528 | 5/2001 |
| WO | 01/69951 | 9/2001 |
| WO | 01/91485 A1 | 11/2001 |
| WO | WO 02/03735 | 1/2002 |
| WO | 03/045101 | 5/2003 |

OTHER PUBLICATIONS

3GPP Technical Report 23.871 V1.10.0, "Enhanced support for User Privacy in location services", tdoc S2-020316, Jan. 23, 2002 (Document 2).

3rd Generation Partnership Project; Technical Specification Group Services and System Aspects; Functional stage 2 description of location services in UMTS (3G TS 23.171 version 1.0.0), 1999, pp. 1-29.

Universal Mobile Telecommunications System (UMTS); Stage 2 Functional Specification of Location Services in UTRAN (3G TS 25.305 version 3.1.0 Release 1999), 2000, pp. 1-46.

Digital cellular telecommunications sytem (Phase2+) (GSM); Universal Mobile Telecommunications System (UMTS); Functional stage 2 description of location services (3GPP TS 23.271 version 4.3.0 Release 4), pp. 1-70.

"Digital cellular telecommunications systems (phase 2+) (gsm); Universal Mobile telecommunications system (umts); Functional stage 2 description of location services (3gpp ts 23.271 version 4.3.0 release 4)" Oct. 2001, XP002196637 Retrieved from the Internet: URL:http://pda.etsi.org/exchangefolder/ts_123271v040300p.pdf>.

European Patent Office issued an European Search Report date Jan. 20, 2010, Application No. 09171344.6.

* cited by examiner

LEGEND: GMLC = GATEWAY MOBILE LOCATION CENTER
HLR/HSS = HOME LOCATION REGISTER/HOME SUBSCRIBER SERVER
SGSN/MSC = SERVING GPRS (GENERAL PACKET RADIO SERVICE) SUPPORT NODE/MOBILE SERVICES SWITCHING CENTER
RAN = RADIO ACCESS NETWORK
UE = USER EQUIPMENT

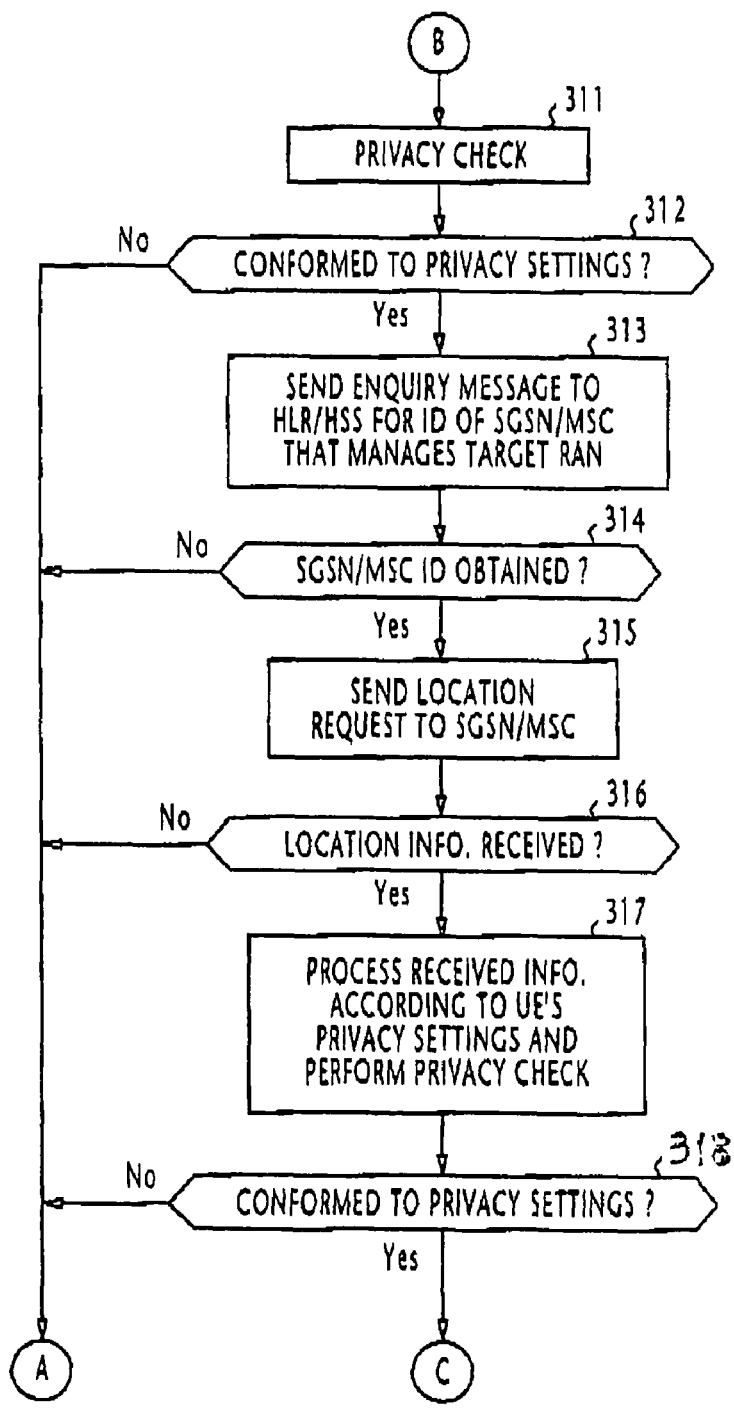

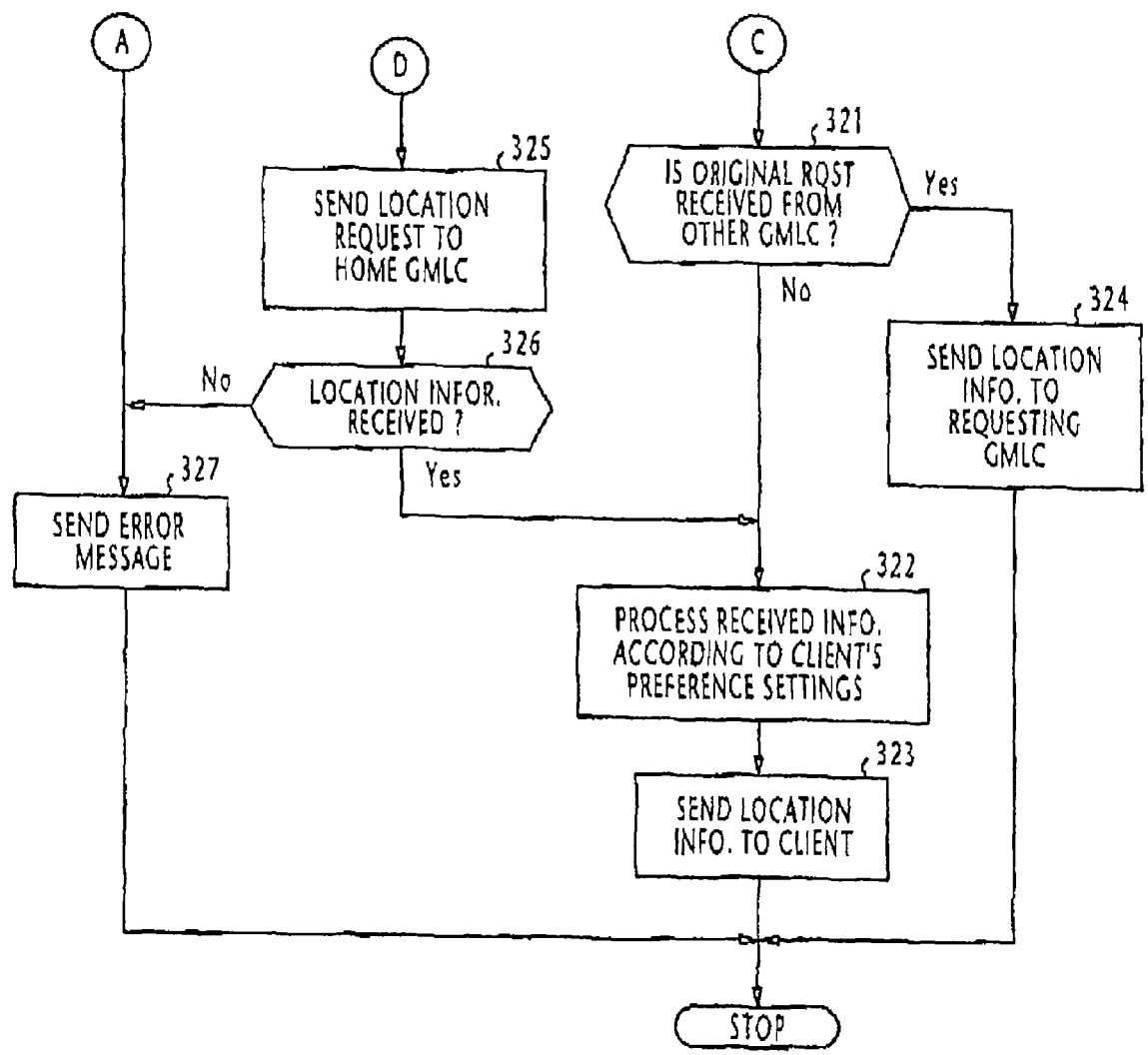

FIG. 5
GATEWAY MOBILE LOCATION CENTER (GMLC)
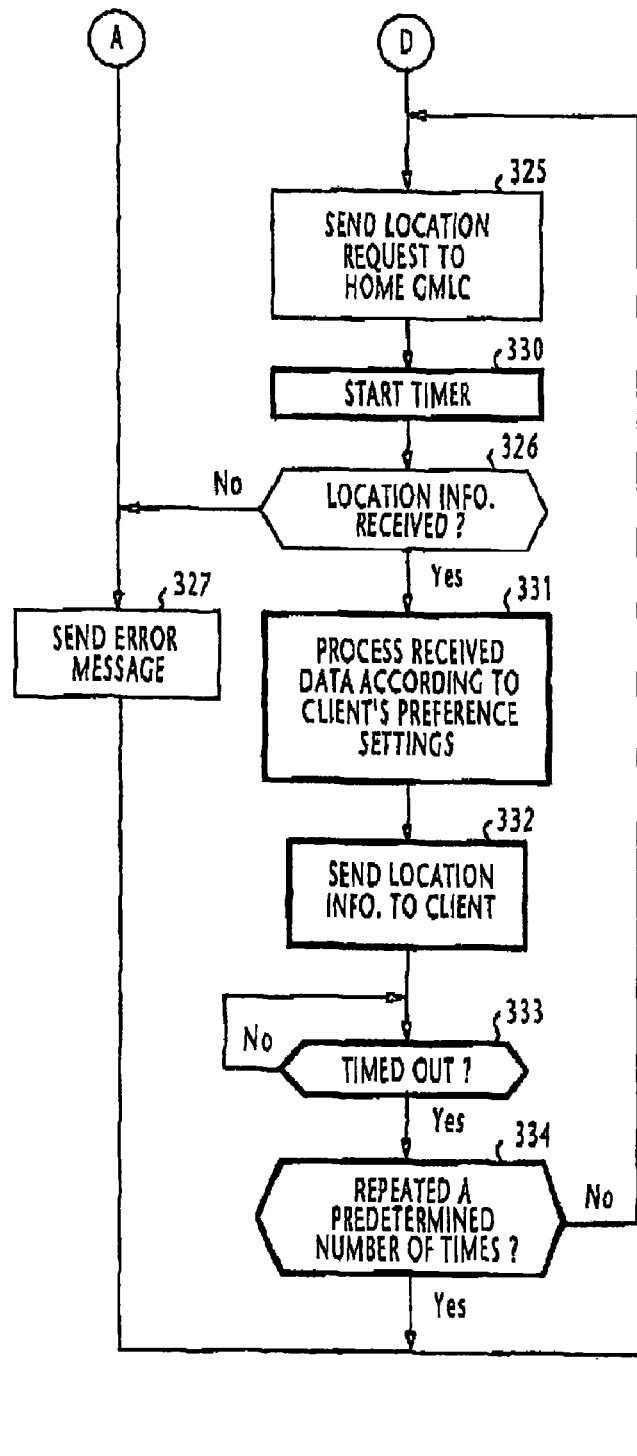
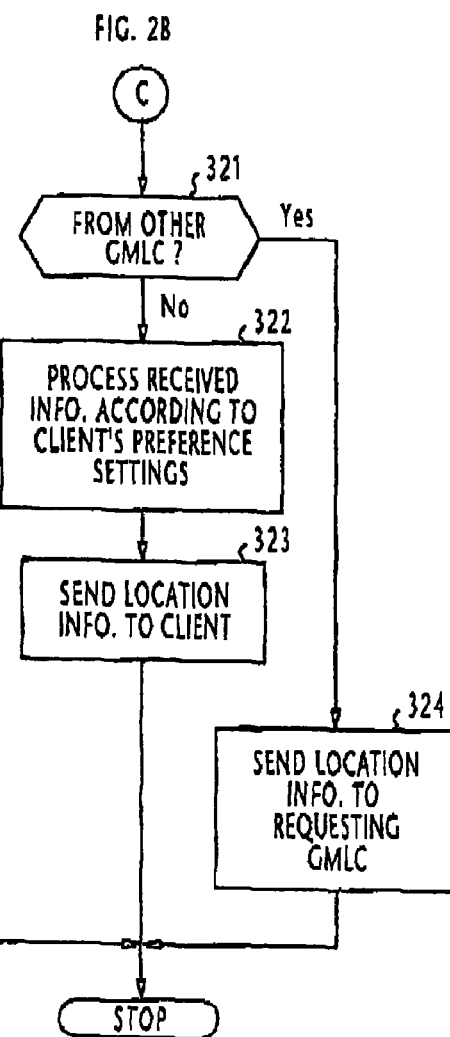

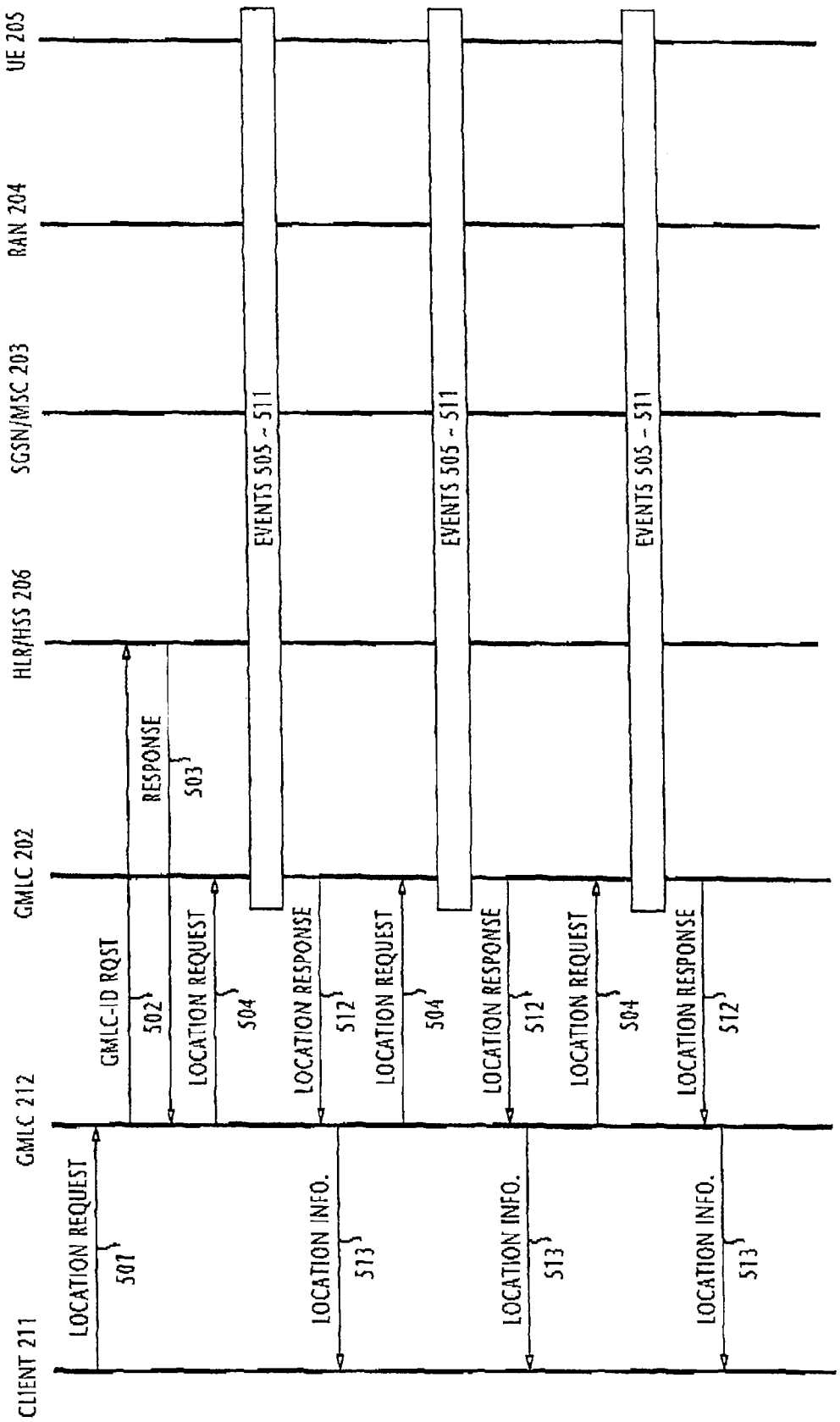

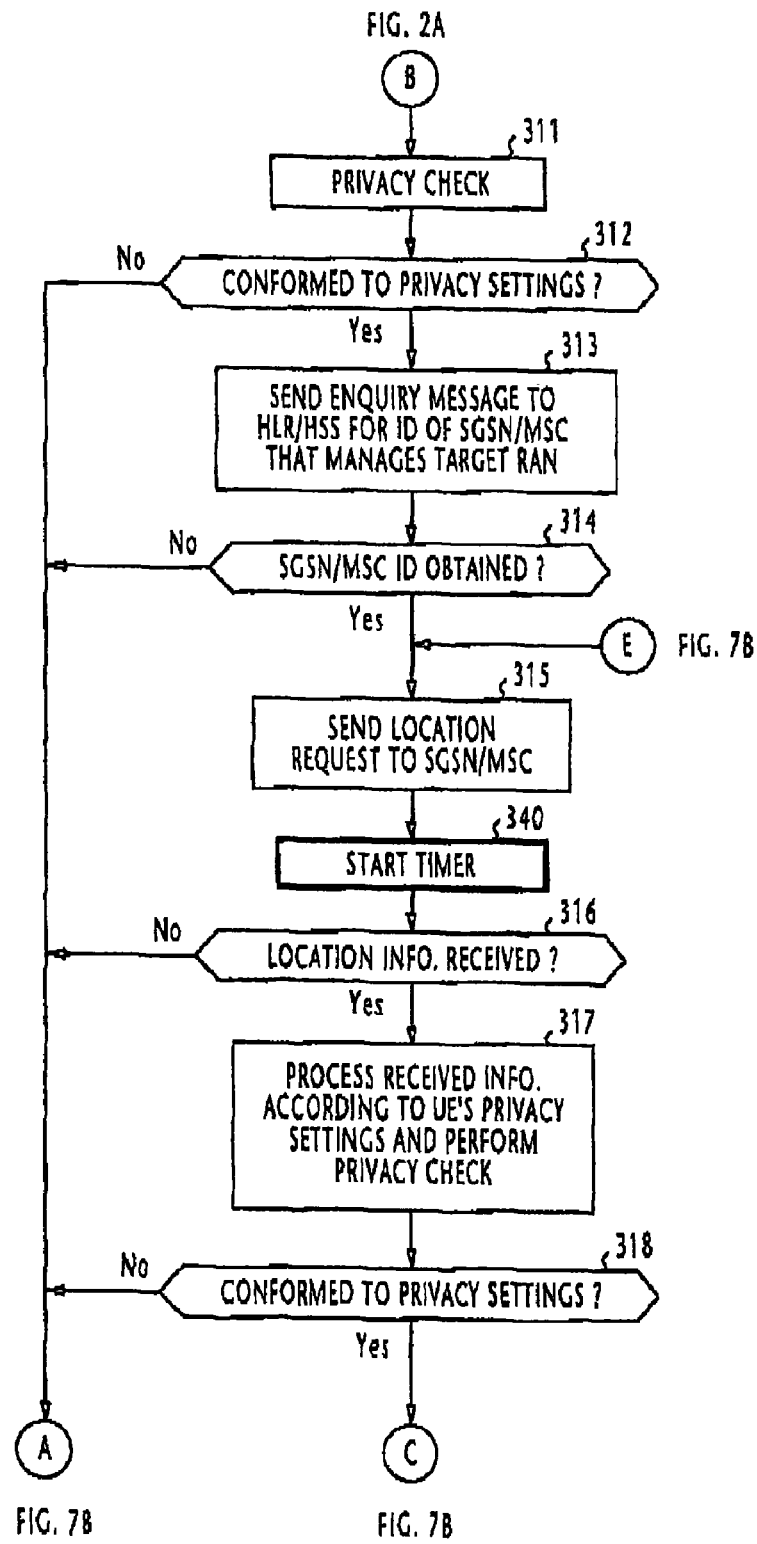

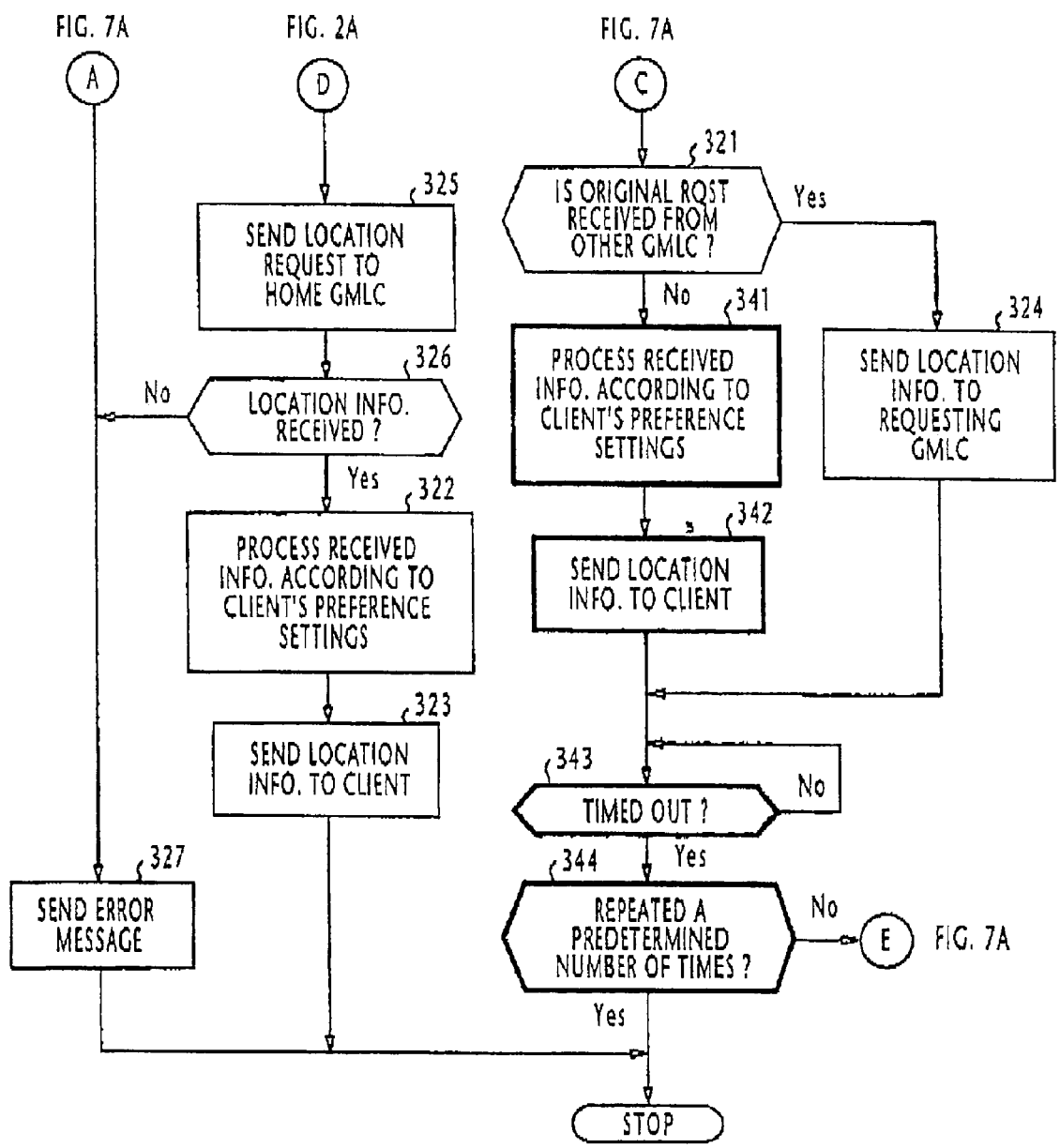

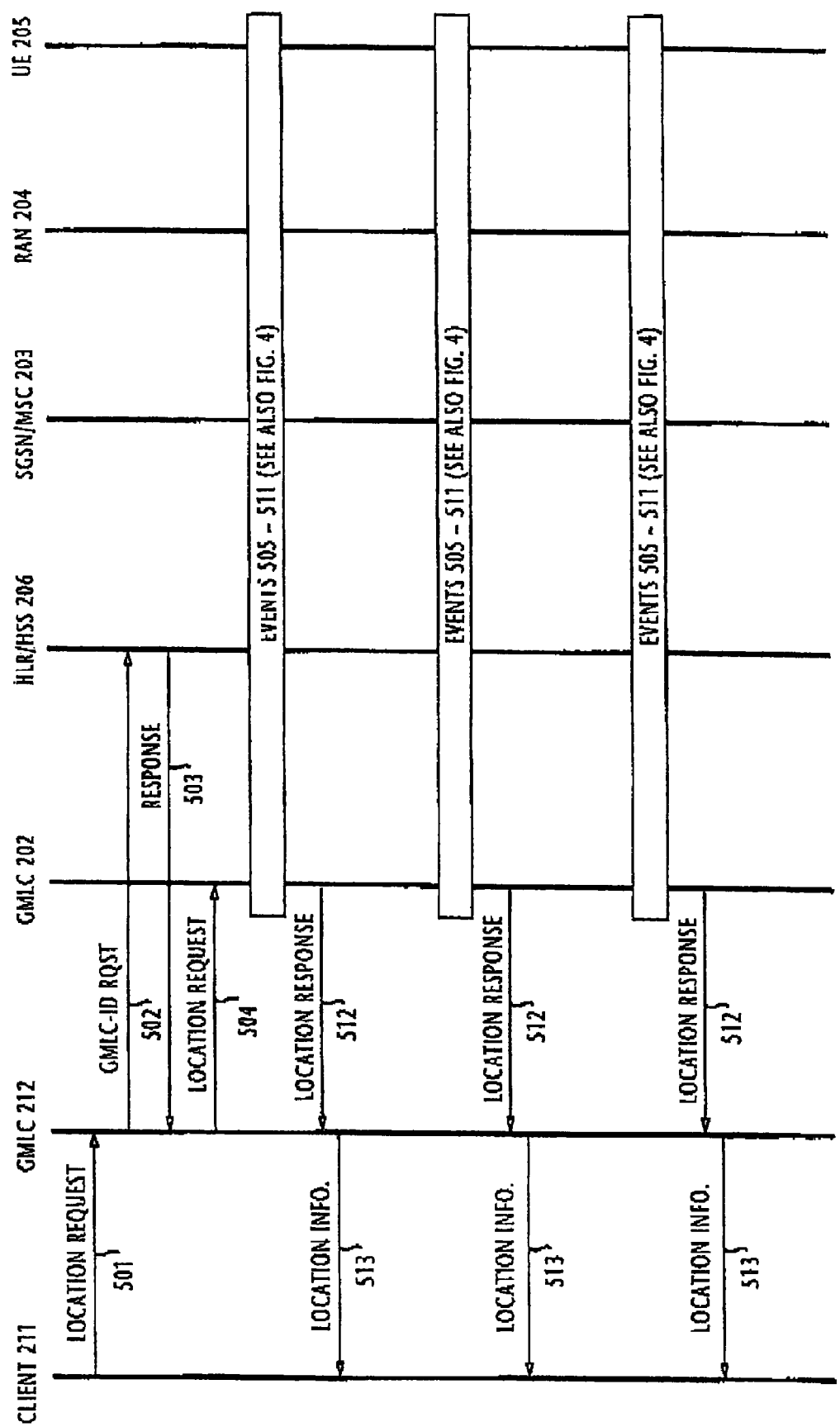

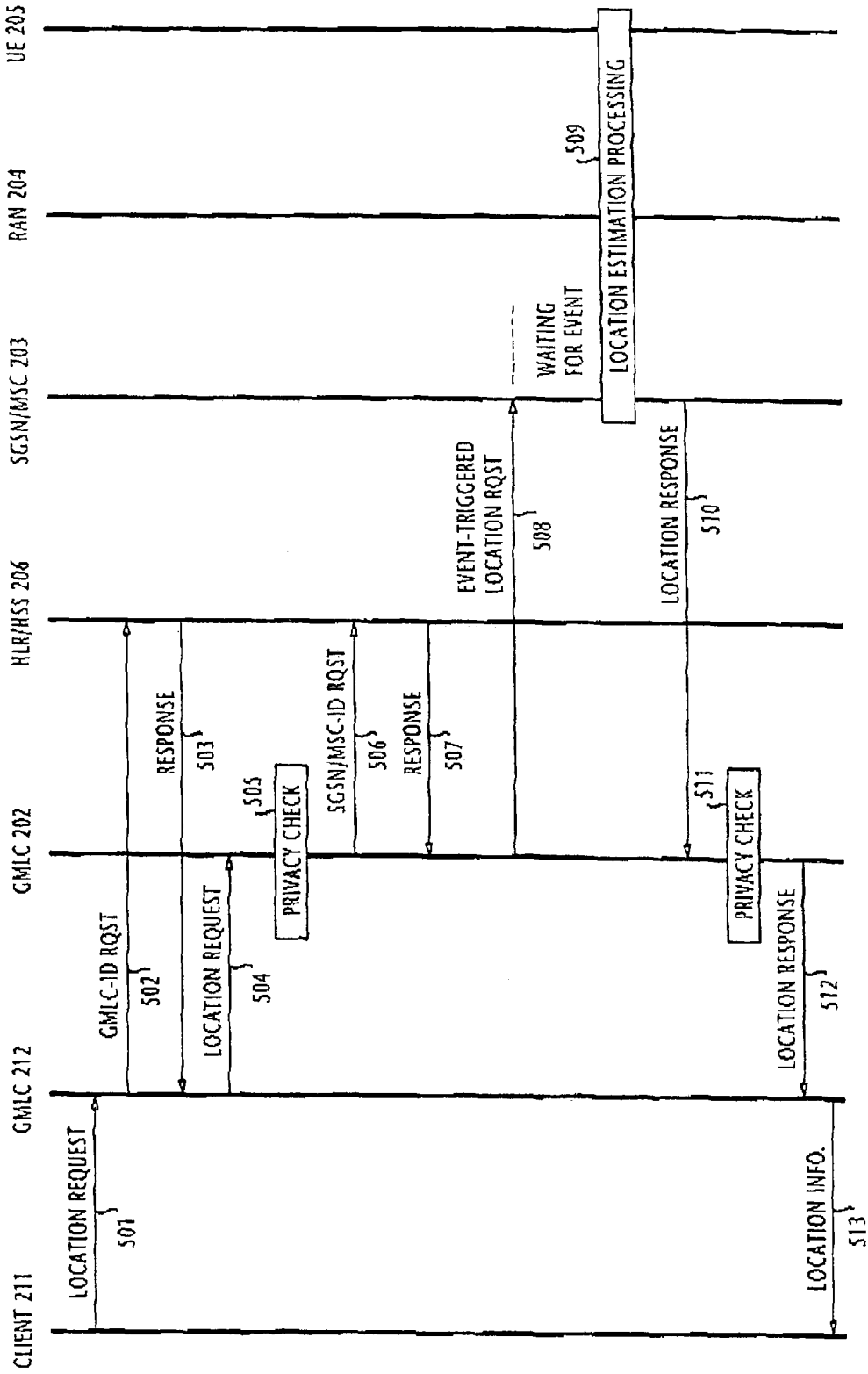

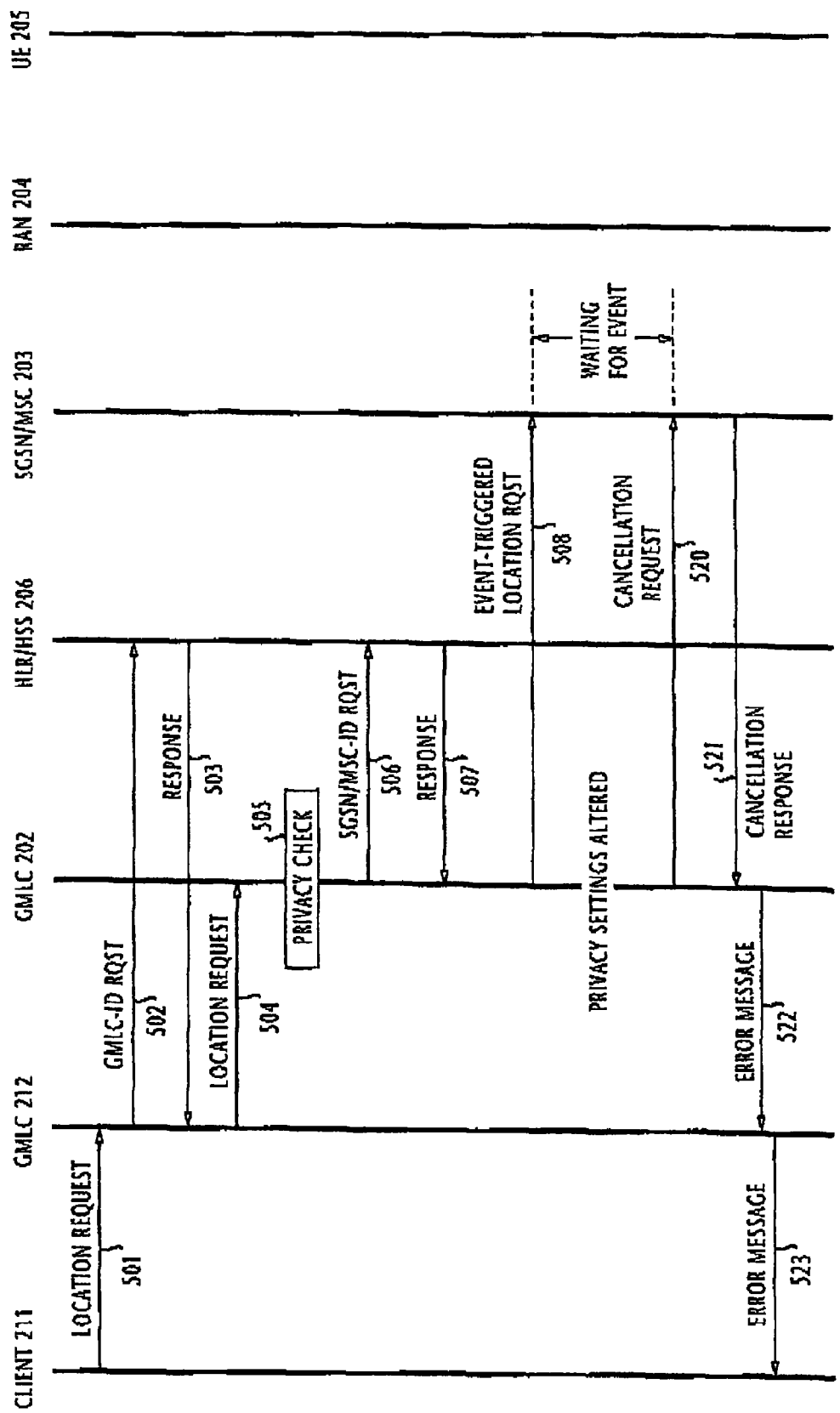

LEGEND:
GMLC = GATEWAY MOBILE LOCATION CENTER
HLR/HSS = HOME LOCATION REGISTER/HOME SUBSCRIBER SERVER
SGSN/MSC = SERVING GPRS (GENERAL PACKET RADIO SERVICE) SUPPORT NODE/MOBILE SERVICES SWITCHING CENTER
RAN = RADIO ACCESS NETWORK
UE = USER EQUIPMENT

LOCATION SYSTEM WITH ENHANCED SECURITY

BACKGROUND OF THE INVENTION

1. Field of the Invention

The present invention relates generally to mobile communication systems, and more specifically to a location system for providing information services to clients as to the location of user equipment (UE) terminals.

2. Description of the Related Art

As a value-added feature of mobile communication service, location information service is an important subject currently being under study by the Third Generation Partnership Program (3GPP) to enhance the functionality of mobile terminals. The 3GPP Technical Specification 23.271 v.5.1.0, "Functional stage 2 description of LCS", December 2001 (hereinafter Document 1), is a current standard that specifies particulars of location information services. Since information as to the location of a mobile terminal is very sensitive to the user and must be protected, mobile communication networks are provided with sophisticated privacy protection functionality which imposes restriction control on accesses according to end-user's privacy settings.

The privacy settings as requested by mobile users are of two types. One is a type of information which can be determined at the time a location request is sent to the location system, such as the name of clients or service classes. The other is of a type of information which can be determined only at the time after the location information of the target mobile terminal is obtained, such as the geographic location of a target user equipment or the time of day the location information is obtained from the location system.

The 3GPP location information system, as described in Document 1 and shown in FIG. 12, is made up of client terminal 101, GMLC (Gateway Mobile Location Center) 102, SGSN/MSC (Serving General packet radio service Support Node/Mobile Services switching Center) 103, local wireless network known as RAN (Radio Access Network) 104 and UE (User Equipment) terminal 105 connected to the RAN via wireless link. HLR/HSS (Home Location Register/Home Subscriber Server) 106 is connected to the GMLC 102 as a database for holding the identity of the RAN to which UE terminals are connected.

When a location request is sent to the system for a target UE terminal, the SGSN/MSC 103 that manages the RAN to which the UE terminal is connected takes the responsibility for protecting the privacy of the terminal. Client terminals which are authorized to access a UE terminal are registered in the location system in advance by the user of the UE terminal in order to protect the user from unauthorized accesses.

However, a need has recently arisen to provide versatile protection functionality, the current client-based scheme is not sufficient to fulfil the need. To implement a versatile protection mechanism for a given service area of the current 3GPP system, it would be necessary to extend the privacy check functionality of all SGSN/MSC systems that exist in that service area. However, the introduction of such a versatile protection mechanism in the SGSN/MSC systems would be too costly if future expansion and system growth are to be taken into account. It is desired that a versatile privacy check mechanism should be provided in a system other than SGSN/MSC. Additionally, a desirable feature of the versatile protection mechanism is to protect UE terminals roaming in an external network from unauthorized access from client terminals of the external network.

With the background just described, an enhanced privacy check mechanism has been proposed in Chapter 7 of 3GPP Technical Report 23.871 v1.1.0, "Enhanced support for User Privacy in location services", tdoc S2-020316, Jan. 23, 2002 (hereinafter Document 2).

However, privacy items protected by the enhanced mechanism relate only to those associated with the time at which location request is made and sent to the location service system. No consideration is taken of those privacy items which can be determined only at the time after the location information of the target mobile terminal is obtained. Furthermore, while Document 2 proposes a scheme for serving requests from clients of a remote network to UE terminals of a home network through collaborations between the networks, specific functions and responsibilities are yet to be determined.

SUMMARY OF THE INVENTION

It is therefore a primary object of the present invention to provide a method and a system for securing location-service privacy protection not only for privacy parameters known at the time a location request is made, but those privacy parameters which can be determined only at the time after the location information of the target mobile terminal is obtained.

It is another object of the present invention to provide a method and a system for securing location-service privacy protection for location requests from clients of an external network requesting the location of UE terminals of a home network by allocating functions and responsibilities to gateways of the networks.

It is a further object of the present invention to provide a method and a system for securing location-service privacy protection for an event-triggered location request which may encounter privacy settings which have already been altered during the time prior to the occurrence of the event.

According to a first aspect, the primary object of the present invention is obtained by a location system comprising a plurality of mobile terminals, a client terminal for transmitting a location request specifying a target mobile terminal, a positioning system accessible to the mobile terminals for producing location information in response to a location request, and a gateway for holding privacy settings of the mobile terminals, performing a first privacy check on a location request of the client terminal using the privacy settings of a target mobile terminal specified by the request, transmitting the request to the positioning system to obtain location information if the request conforms to the privacy settings, and performing a second privacy check on the location information using the privacy settings of the target mobile terminal.

According to a second aspect, the present invention provides a location system comprising a plurality of mobile terminals, a plurality of client terminals for transmitting a location request specifying a target mobile terminal, a positioning system accessible to the mobile terminals for producing location information of the mobile terminal in response to a location request, and a plurality of gateways for maintaining privacy settings of the mobile terminals. On receiving a location request from a client terminal, each gateway determines which of the gateways maintains the privacy settings of the specified target mobile terminal, and transmits the location request to a gateway if this gateway maintains the privacy settings of the specified target mobile terminal. Each gateway performs a first privacy check on a location request received either from the client terminal or from other gateway using the privacy settings of the specified target mobile terminal maintained in the gateway, transmits the request to the positioning system to obtain location information of the mobile terminal if the request conforms to the privacy settings, and performs a second privacy check on the location information using the privacy settings maintained in the gateway.

According to a further aspect, each gateway is arranged to transmit an event-triggered location request to the positioning system to obtain location information of the target mobile terminal if a specified event occurs with respect to the target mobile terminal, perform the second privacy check on the location information if the privacy settings of the target mobile terminal is not altered before the location information is obtained from the positioning system, and transmit a cancellation request to the positioning system if the privacy settings of the target mobile terminal is altered before the location information is obtained from the positioning system.

BRIEF DESCRIPTION OF THE DRAWINGS

The present invention will be described in detail further with reference to the following drawings, in which:

FIGS. 2A, 2B and 2C are a flowchart of the operation of GMLCs of FIG. 1 when a location request is received from the associated client terminal;

FIG. 5 is a flowchart of the operation of a home GMLC when a location request is repeatedly transmitted from a requesting GMLC to the home GMLC according to a modified embodiment of the present invention;

FIG. 6 is a sequence diagram of a series of events that occur across the location system when the routine of FIGS. 2A, 2B and 5 is executed;

FIGS. 7A and 7B are a flowchart of the operation of a remote GMLC when a location information request is repeatedly transmitted from the remote GMLC to an SGSN/MSC according to a further modification of the present invention;

FIG. 8 is a sequence diagram of a series of events that occur across the location system when the routine of FIGS. 2A, 7A and 7B is executed;

FIGS. 10A and 10B are sequence diagrams of a series of events that occur in the system when the routine of FIGS. 2A, 2C and 9 is executed;

DETAILED DESCRIPTION

Figure 1:
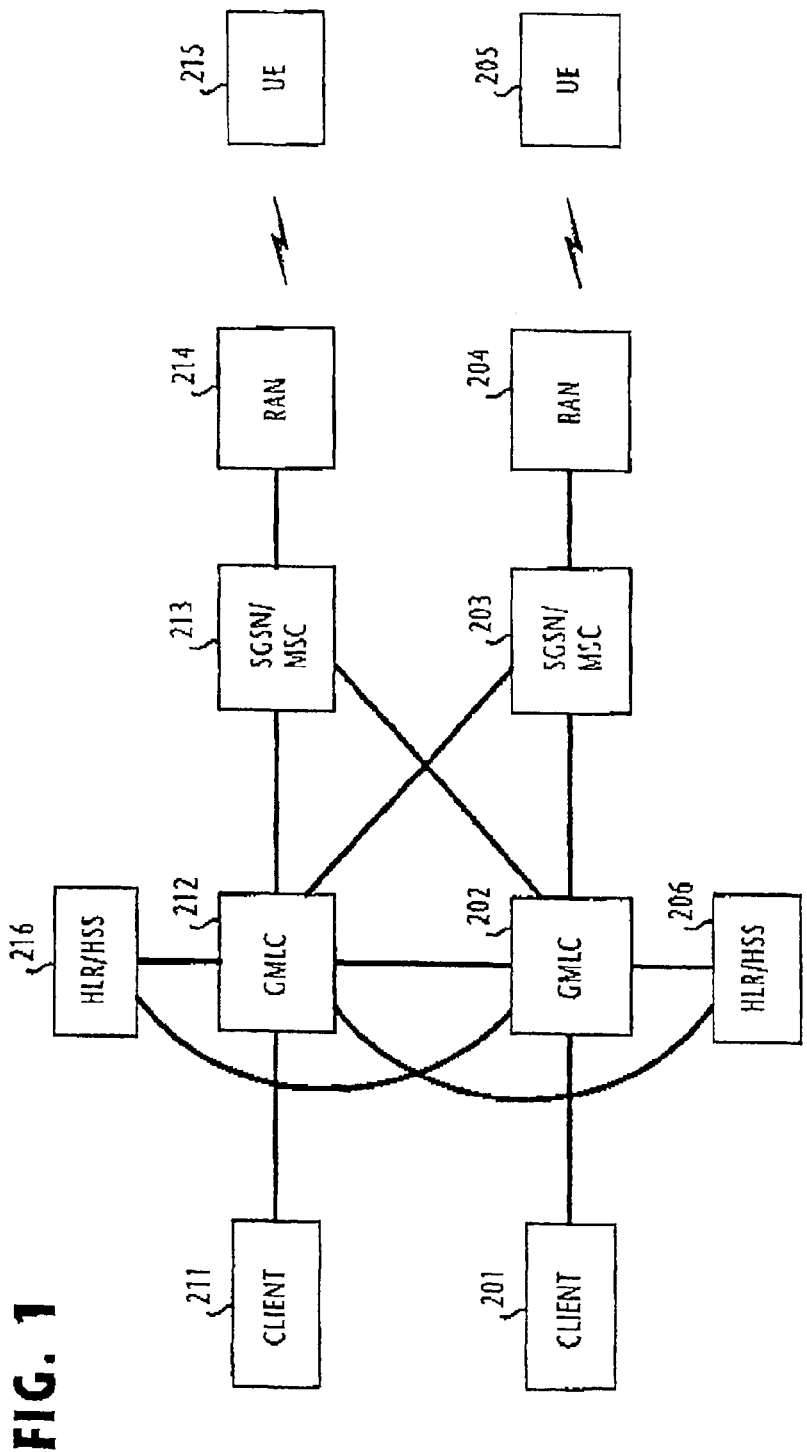
FIG. 1 is a block diagram of a location system of the present invention for implementing location services with enhanced support for user privacy in a multi-network environment.

Referring now to FIG. 1, there is shown a location system of a mobile multi-network environment according to the present invention. The location service system is comprised of a plurality of GMLCs (gateway mobile location centers) 202 and 212 to which client terminals 201 and 211 are respectively connected to send their location requests. GMLC 202 is connected to SGSN/MSCs (serving GPRS support node/mobile service switching centers) 203 and 213. GMLC 212 is also connected to both SGSN/MCSs 203, 213. Further, both GMLCs are interconnected to each other to send a location request to the other GMLC when the request is for a UE terminal of the external network. RANs 204 and 214 are connected to SGSN/MSCs 203, 213, respectively. UE terminals 205 and 215 are connected via a wireless link to the RANs 204, 214, respectively. For simplicity, only one RAN is shown connected to each SCSN/MSC as a representative of a number of RANs managed by the associated SGSN/MSC. Identification data of SGSN/MSC 203, which manages RAN 204 where UE terminal 205 is connected, is maintained in an HLR/HSS (home location register/home subscriber server) 206 and the identification data of SGSN/MSC 213, which manages RAN 214 where UE terminal 215 is connected, is maintained in an HLR/HSS 216. The privacy settings of UE terminal 205 are stored in GMLC 202 and the identification data of GMLC 202 is stored in HLR/HSS 206. The privacy settings of UE terminal 215 are stored in GMLC 212 and the identification data of GMLC 212 is stored in HLR/HSS 216. Each of the HLR/HSS 206 and 216 is connected to both GMLCs 202, 212.

Figure 2A:
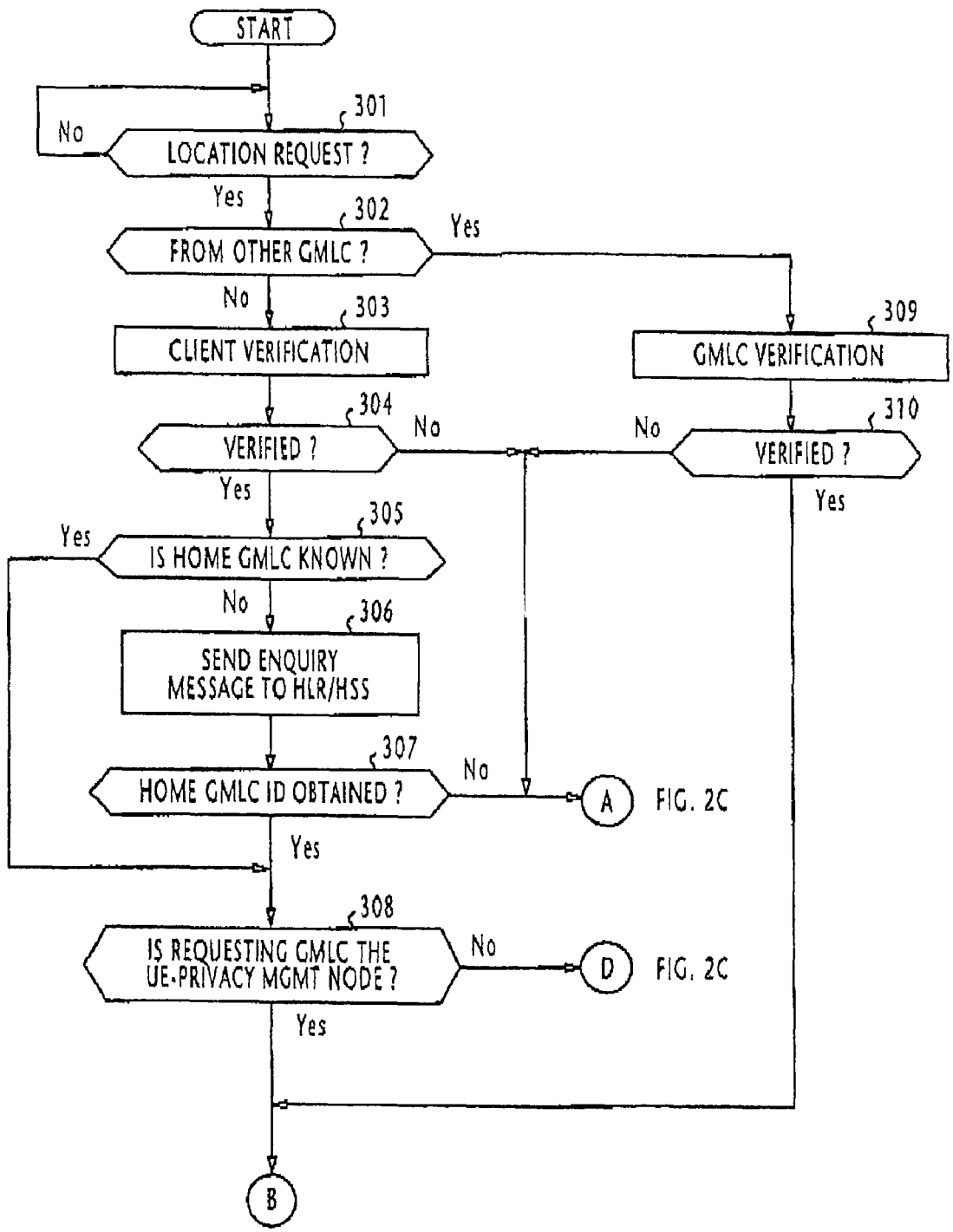

Each of the GMLCs 202 and 212 operates according to a flowchart shown in FIGS. 2A, 2B and 2C.

In response to a location request either from a client terminal or other GMLC (step 301, FIG. 2A), the GMLC of each network (hereinafter requesting GMLC) proceeds to step 302 to check to see if the location request is from a client terminal or from other GMLC. If it is determined that the location request is from a client terminal, flow proceeds from step 302 to step 303 to verify the authentication of the requesting client terminal. If the verification fails, flow proceeds to step 327 (FIG. 2C) to send an error message to the requesting client terminal.

If the client terminal is verified (step 304), flow proceeds to step 305 to determine whether a home GMLC that manages the privacy information of the target UE is already known. If the requesting GMLC is the privacy management node of the target UE terminal, the decision at step 305 is affirmative and flow proceeds to step 308.

If the decision at step 305 is negative, flow proceeds to step 306 to send an enquiry message to the HLR/HSS of the network which the target UE belongs to, in order to obtain information as to the identity of a home GMLC that maintains the privacy information of the target UE. If the identity of the home GMLC is obtained from the HLR/HSS, the decision at step 307 is affirmative and flow proceeds to step 308 to determine whether the received GMLC identity indicates that the requesting GMLC is the home GMLC of the target UE.

If it is determined, at step 308, that the requesting GMLC is the home GMLC, the requesting GMLC proceeds to step 311 (FIG. 2B) to perform a privacy check on the location request based on the privacy settings of the target UE terminal and determines whether the location request received from the client terminal conforms to the privacy settings of the UE terminal (step 312). If the location request conforms to the privacy settings of the target UE, the home GMLC proceeds from step 312 to step 313 to send an enquiry message to the HLR/HSS system for requesting the identity of SGSN/MSC that manages the target RAN.

If the UE terminal 205 is the target UE, the identity of SGSN/MSC 203 will be received (step 314) and the home GMLC proceeds to step 315 to transmit a location request to the SGSN/MSC. In response to the location request from the home GMLC, the SGSN/MSC begins to process location estimation by collaborating with the RAN and the target UE terminal and transmits the location information of the target UE terminal to the home GMLC.

When the home GMLC receives a response message from the SGSN/MSC (step 316), it proceeds to step 317 to process the received location information according to the privacy settings of the target UE terminal 205 and performs a privacy check on the processed location information. At step 318, the processed location information is checked against the privacy settings of the target UE for conformance. If the processed location information conforms to the privacy settings of the target UE, flow proceeds from step 318 to step 321 (FIG. 2C) to check to see if the location request originally received at step 301 is from other GMLC If the location request initially received at step 301 is from the client terminal, the decision at step 321 is negative and the home GMLC proceeds to step 322 to process the location information according to the preference settings specified by the client terminal. If the client wishes to receive the location information as address information, this data processing is a process of format conversion from geographical coordinate system (latitude and longitude) to address information on a geographic map. At step 323, the location information is transmitted from the local GMLC to the requesting client terminal.

If a location request the home GMLC has received is from a remote GMLC, the decision at step 302 is affirmative and flow proceeds to step 309 to verify the authentication of this GMLC. If the remote GMLC is not verified at step 310, an error message is sent to the remote GMLC (step 327). If the remote GMLC is verified, flow proceeds to step 311 to perform a privacy check on the received location information as described above.

If the requesting GMLC is not the UE-privacy management node, the decision at step 308 is negative, and flow proceeds to step 325 (FIG. 2C) to send a location request to the home GMLC and waits for location information from the home GMLC at step 326. When location information is received from the home GMLC, flow proceeds from step 326 to step 322 to process the location information according to the preference settings of the client terminal and transmit the processed location information to the client terminal. If no location information is received, flow proceeds from step 326 to step 327 to send an error message to the client terminal.

If the decision at steps 312, 314, 316 and 318 is negative, flow proceeds to step 327 to send an error message to the requesting source.

Figure 3:
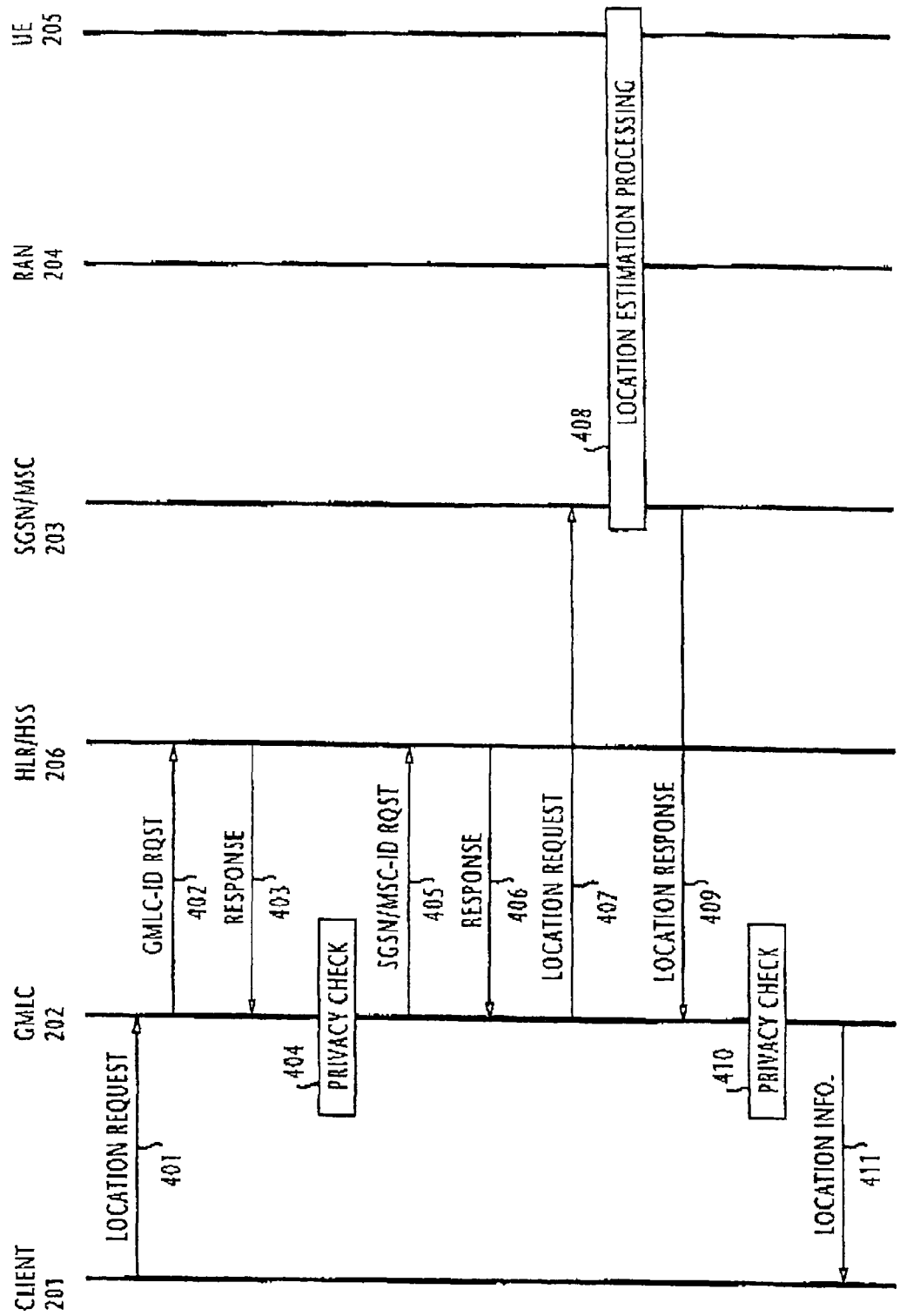
FIG. 3 is a sequence diagram for illustrating a series of events that occur across the location system when a home network client is requesting the location information of a UE terminal from the home network.

Therefore, if the client terminal 201 requested the location information of the UE terminal 205, the GMLC 202 will receive a location request 401 (see FIG. 3) from the client terminal 201 (steps 301 to 304). If the GMLC 202 does not know the identity of the GMLC which manages the privacy settings of the target UE, the decision at step 305 will be negative and the GMLC 202 sends an enquiry message 402 at step 306 to the HLR/HSS 206. The GMLC 202 receives, at step 307, a response message 403 from the HLR/HSS 206, indicating that GMLC 202 is the privacy management node of the target UE terminal 205. Thus, the GMLC 202 makes an affirmative decision at step 308 and performs a privacy check 404 at step 311. If the GMLC 202 knows that it is the managing node of the privacy settings of the target UE, the decision at step 305 is affirmative, steps 306 and 307 will be skipped.

Once the privacy check 404 has been performed (step 311) and conformance indicated (step 312), an enquiry message 405 is sent (step 313) to the HLR/HSS 206 for requesting it to respond with a message 406 containing the identity of an SCSN/MSC that manages the RAN 204 where the target UE is connected (step 314). A location request 407 is sent from the GMLC 202 (step 315) to the SGSN/MSC 203. In response to the location request 407, the SGSN/MSC 203 begins to process location estimation by collaborating with the RAN 204 and the target UE terminal 205 (as indicated by an event 408) and transmits the location information of the target UE 205 as a response message 409 to the GMLC 202. The location information contained in the response message 409 is processed according to the UE's privacy settings. Privacy check 410 is then performed on the processed location information at step 317 to check to see if it conforms to the UE's privacy settings (step 318). The GMLC 202 processes the location information according to the preference settings of the client terminal 201 (step 322). The processed location information is transmitted in a message 411 to the client terminal 201.

Therefore, if the client terminal 211 requested the location information of the UE terminal 205, the GMLC 212 will receive a location request 501 (see FIG. 4) from the client terminal 211 (steps 301 to 304). If the GMLC 212 has no knowledge of the identity of the GMLC which manages the privacy settings of the target UE, the decision at step 305 will be negative and the GMLC 212 sends an enquiry message 502 at step 306 to the HLR/HSS 206. The GMLC 212 receives, at step 307, a response message 503 from the HLR/HSS 206, indicating that GMLC 202 is the privacy management node of the target UE terminal 205. Therefore, the GMLC 212 makes a negative decision at step 308 and proceeds to step 325 (FIG. 2C) to send a location request 504 to the GMLC 202. This location request may contain client information such as the display format of location information and functions supported by the client terminal. The GMLC 202 receives this location request 504 at step 301 and makes an affirmative decision at step 302 and proceeds to step 309 to verify the authentication of GMLC 212. If the GMLC 212 is verified (step 310), flow proceeds to step 311 to perform a privacy check 505 on the received location information.

Once the privacy check 505 has been performed (step 311) and conformance indicated (step 312), the GMLC 202 sends an enquiry message 506 (step 313) to the HLR/HSS 206 for requesting it to respond with a message 507 containing the identity of an SGSN/MSC that manages the RAN 204 where the target UE is connected (step 314). A location request 508 is sent from the GMLC 202 (step 315) to the SGSN/MSC 203. In response to the location request 508, the SGSN/MSC 203 begins to process location estimation by collaborating with the RAN 204 and the target UE terminal 205 (as indicated by an event 509) and transmits the location information of the target UE 205 in a response message 510 to the GMLC 202. The location information contained in the response message 510 is processed according to the UE's privacy settings and a privacy check 511 is performed at step 317 and checked against the UE's privacy settings for conformance (step 318). Flow proceeds from step 318 to step 321. Since the original location request has been received from the GMLC 212, the GMLC 202 makes an affirmative decision at step 321 and proceeds to step 324 to send the location information in a message 512 to the GMLC 212. Following the transmission of the location request 504, the GMLC 212 has been waiting for the location response at step 326. On receiving the message 512, the GMLC 212 proceeds to step 322 to process the received location information according to the preference settings of the client terminal 211 and transmits the processed location information in a message 513 to the client terminal 211 (step 323).

It will be seen from the foregoing description that enhanced privacy protection is achieved since privacy check is performed on location information before the client terminal is notified of location information.

Further, the client terminal dependent processes are handled by a GMLC which has received a location request from the client terminal, while the target UE-privacy dependent processes are handled by a GMLC which maintains the privacy settings of the target UE terminal. As a result, the home and external networks can jointly operate in an efficient manner to process a location request received from a client terminal.

According to variations of the present invention, location information of a target UE terminal can be obtained at periodic intervals.

A flowchart shown in FIG. 5 is a modification of the flowchart of FIG. 2C. In FIG. 5, a timer is started at step 330 immediately following the transmission of a location request from the requesting GMLC to a home GMLC (step 325). After receiving location-information from the home GMLC (step 326), flow proceeds to step 331 to process the received location information according to the preference settings of the client terminal and transmits the processed location information to the client terminal at step 332, in a manner identical to steps 322 and 323. The requesting GMLC checks to see if the timer has reached its time-out period. If this is the case, flow proceeds to step 334 to check to see if the transmission of a location request has been repeated a predetermined number of times. If not, flow returns to step 325 to send the next location request to the home GMLC. When the transmission of a location request have been repeated the predetermined number of times, flow advances to the end of the routine.

Figure 4:
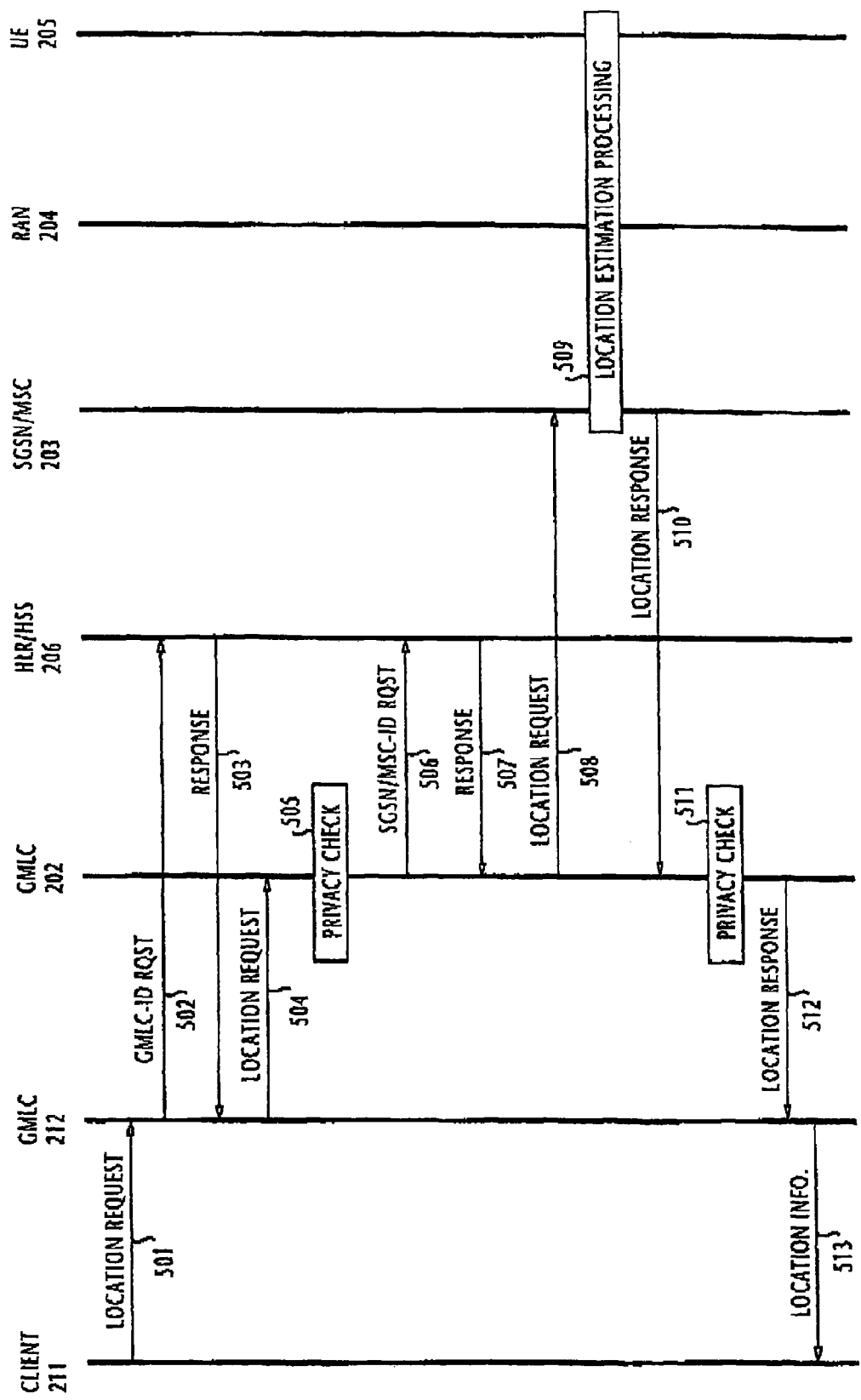
FIG. 4 is a sequence diagram for illustrating a series of events that occur across the location system when a home network client is requesting the location information of a UE terminal from an external network.

A sequence diagram of FIG. 6 illustrates a series of events that occur when the requesting GMLC operates according to the routine of FIGS. 2A, 2B and 5. In FIG. 6, parts corresponding in significance to those of FIG. 4 are marked with the same numerals. Therefore, events proceed in the same manner as those of FIG. 4 until the GMLC 212 transmits the location information 513 to the client terminal 211. When the location request 504 is initially transmitted from the GMLC 212 to the GMLC 202, the timer is started (step 330). Following the initial transmission of location information 513, the timer expires (step 333) and the next location request 504 is transmitted from the GMLC 212 to the GMLC 202. The location information is repeatedly produced and transmitted to the client terminal until the count number of the repetitions attains a predetermined value (step 334).

Instead of the requesting GMLC, the home GMLC may perform the timing operation. The flowchart of FIG. 2B is modified as shown in FIG. 7A to include step 340 where the timer is started immediately following the transmission of a first location request to the SGSN/MSC at step 315. The flowchart of FIG. 2C is modified as shown in FIG. 7B by the inclusion of steps 341 to 344 following step 321. If the original location request is received from the client terminal, the decision at step 321 is negative and flow proceeds to step 341 to process the location information previously received at step 316 (FIG. 7A) according to the client's settings and the processed location information is transmitted to the client (step 342) in the same way as discussed in connection with steps 322 and 323. Step 343 makes a time-out check on the timer. If the timer has expired, flow proceeds to step 344. If the count number of repetitions is smaller than the predetermined value, flow returns to step 315 (FIG. 7A) to transmit the next location request to the SGSN/MSC.

A sequence diagram of FIG. 8 illustrates a series of events that occur when the GMLC 202 operates according to the routine of FIGS. 2A, 7A and 7B. In FIG. 8, parts corresponding in significance to those of FIG. 4 are marked with the same numerals. Therefore, events proceed in the same manner as those of FIG. 4 until the GMLC 212 transmits the location information 513 to the client terminal 211. When the GMLC 202 transmits a location request to the SGSN/MSC 203 (as event 508) (step 315), the timer is started (step 340). Following the initial transmission of location information 513, the timer expires (step 343) and the next location request is transmitted as event 508 from the GMLC 202 to the SGSN/MSC 203. In this way, the location information is repeatedly produced and transmitted to the client terminal until the count number of the repetitions attains a predetermined value (step 344).

Figure 9:
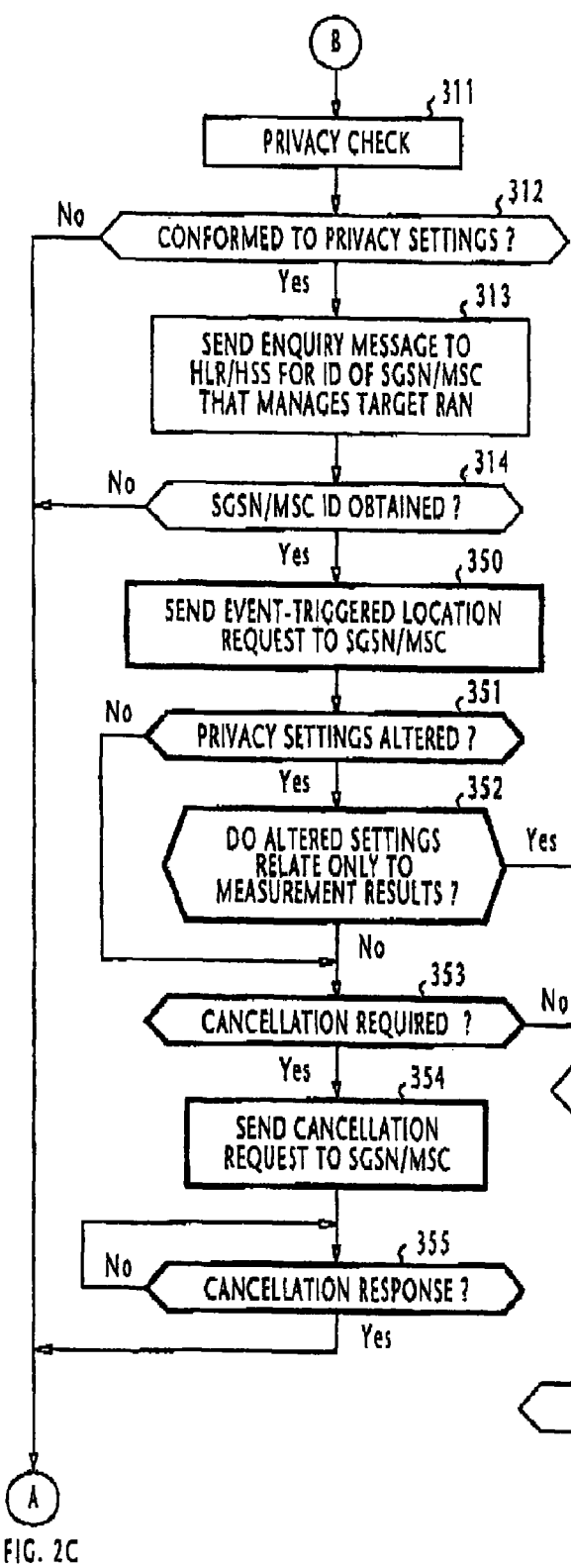
FIG. 9 is a flowchart of the operation of a remote GMLC when an event-triggered location request is sent to an SGSN/MSC to obtain location information of a target UE terminal when an event occurs in the target UE terminal.

A further modification of the present invention is shown in FIG. 9 in which parts corresponding in significance to those in FIG. 2B are marked with the same numerals. FIG. 9 differs from FIG. 2B in that it further includes steps 350 to 355. Following the acquisition of the identity of an SGSN/MSC at step 314, an event-triggered location request is sent from the home GMLC to the SGSN/MSC (step 350), requesting the latter to initiate location information processing if an event specified in the request message (such as when the target UE encounters an inter-cell hangover or when the target UE returns to the network) has occurred with respect to the target UE terminal and send the location information back to the home GMLC. Flow proceeds to decision step 351 to determine whether the privacy settings of the target UE terminal has been altered. If this is the case, the home GMLC determines whether the altered settings relate only to location information. If the decision is affirmative, flow proceeds to decision step 316 to wait for location information of the target UE from the SGSN/MSC.

If the altered privacy settings do not exclusively relate to location information, the decision at step 351 or 352 is negative and the home GMLC proceeds to step 353 to determine whether cancellation of the event-triggered location request is required. If cancellation is not required, flow proceeds to step 316. If cancellation is required, a cancellation request is sent to the SGSN/MSC to cancel the even-triggered location request (step 354) and wait for a cancellation response from the SGSN/MSC (step 355). When a cancellation response is received, flow proceeds to step 327 to send an error message.

If the routine of FIGS. 2A, 2C and 9 is performed to transmit an event-triggered location request from the home GMLC to the SGSN/MSC and an event is actually triggered by the target UE, a series of events similar to that of FIG. 4 may take place as shown in FIG. 10A, in which parts corresponding in significance to those of FIG. 4 are marked with the same numerals. When an event-triggered location request 508 is transmitted from the GMLC 202 to the SCSN/MSC 203 (step 350), the GMLC 202 enters a standby mode waiting for the occurrence of a specified event with respect to the target UE. If there is no alteration in the privacy settings of the target UE terminal until the event occurrence, flow proceeds from step 350 through steps 351, 352 or 353 to step 316 to wait for location information. Meanwhile, a process for producing location information (509) begins when the event occurs, and a location response message 510 is sent from the SGSN/MSC 203 to the GMLC 202. In response to this message, the GMLC 202 performs a privacy check 511 (steps 317, 318).

If the privacy settings of the target UE have been altered while waiting for the event, a series of events may take place in the location system as shown in FIG. 10B. When an event-triggered location request 508 is transmitted from the GMLC 202 to the SGSN/MSC 203 (step 350), the GMLC 202 enters a standby mode waiting for the occurrence of the event. If the privacy settings of the target UE have been altered while waiting for the event, flow proceeds from step 350 through steps 351, 352 or 353 to step 354 to send a cancellation message 520 is sent to the SGSN/MSC 203. The SGSN/MSC 203 replies with a cancellation response message 512, which is detected at step 355 and an error message is sent to the GMLC 212.

Since the decision mechanism identifies an event-triggered location request which would be adversely affected by altered privacy settings, the present invention eliminates useless transactions which would otherwise be generated while the system is waiting for an event.

Figure 11:
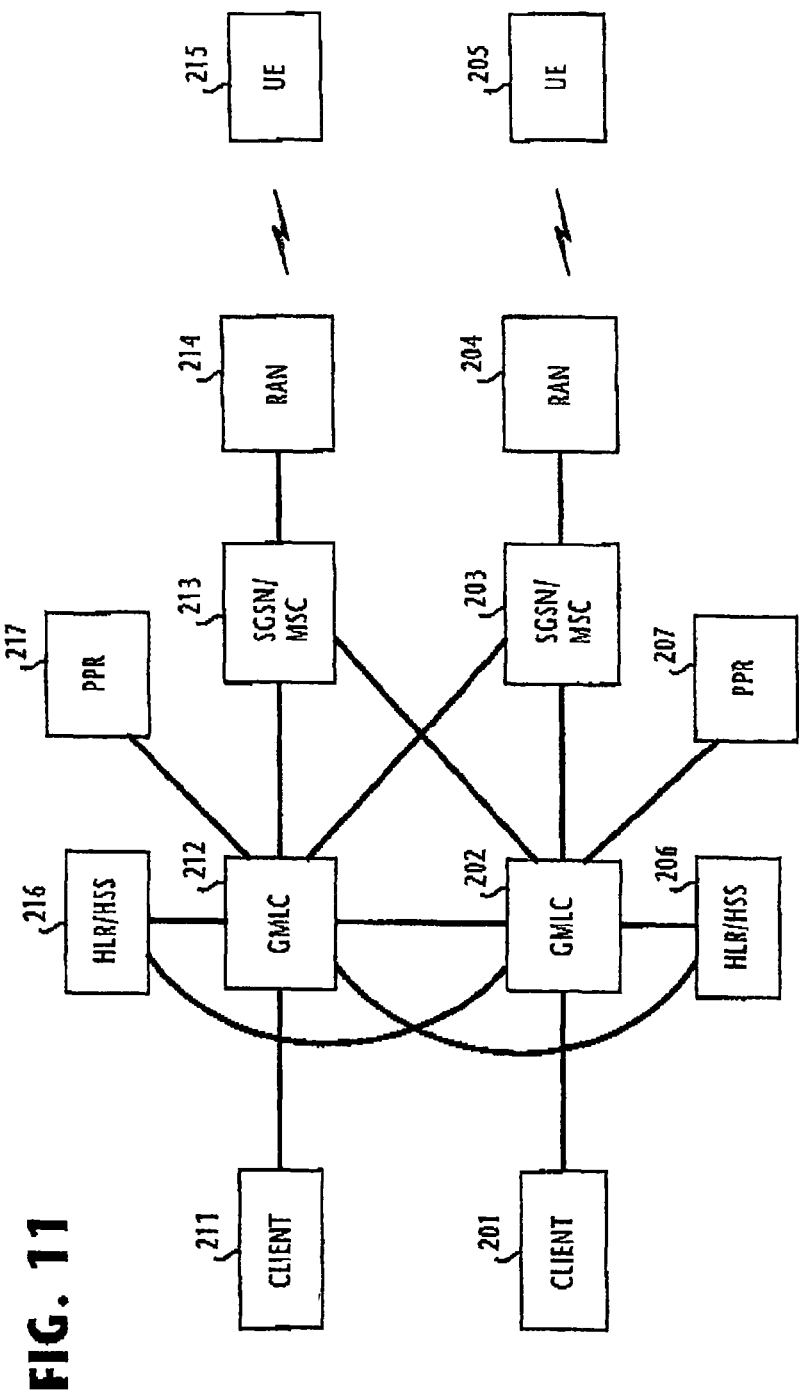
FIG. 11 is a block diagram of a modified location system of the present invention.
Figure 12:
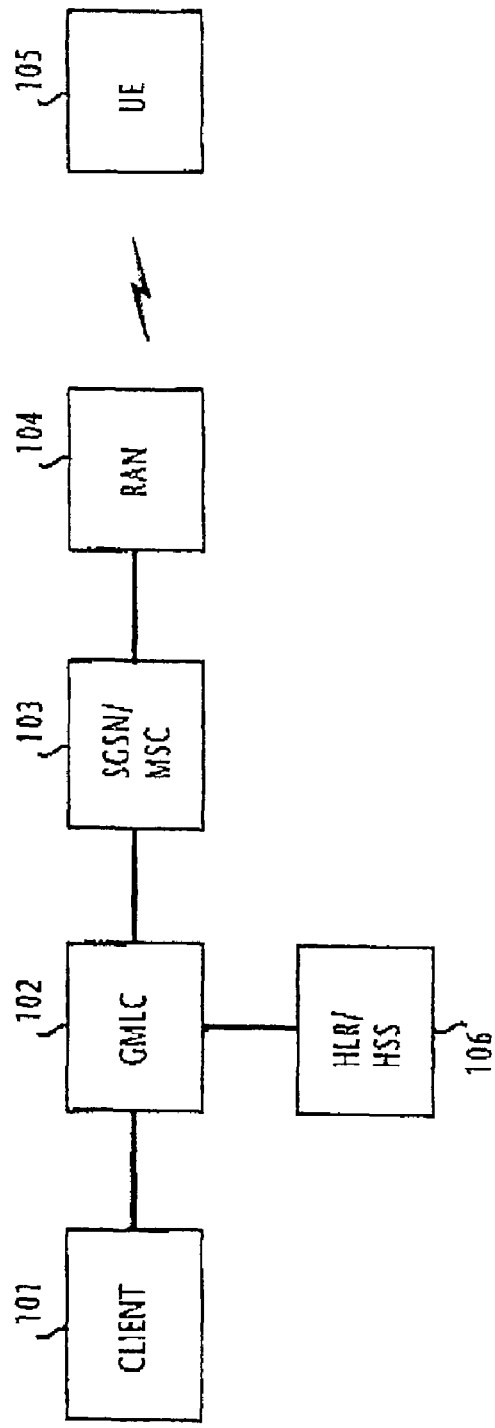
FIG. 12 is a block diagram of a prior art location system.

As shown in FIG. 11, the location system of FIG. 1 is modified to include privacy profile registers (PPR), or privacy managers 207 and 217 to store privacy settings of the UE terminals 205 and 215, respectively. PPRs 207 and 217 are connected to the GMLCs 202 and 212, respectively. In this embodiment, privacy check is performed by collaboration between each GMLC and the associated PPR. When the GMLC 202, for example, performs a privacy check, it sends a request message to the associated PPR 207 that holds the privacy settings of the UE terminal 205. PPR 207 may be entrusted to conduct a privacy check by using the stored settings of the target UE and sends the result of the check to the requesting GMLC. Alternatively, the PPR 207 is requested to send the privacy settings of the target UE to the requesting GMLC and the latter takes responsibility to perform the privacy check by using the transmitted privacy setting.

What is claimed is:

1. A location service system comprising:
a target mobile terminal;
a client terminal transmitting a location request requesting a location of the target mobile terminal;
a first gateway receiving the location request;
a second gateway receiving the location request, performing a privacy check on the received location request using privacy settings of the target mobile terminal and sending a positioning request requesting the location of the target mobile terminal; and
a positioning system for producing location information for the target mobile terminal in response to the positioning request,
wherein the first gateway receiving the location request determines whether the first gateway stores a privacy profile of the target mobile terminal, and sends the location request to the second gateway, which stores the privacy profile of the target mobile terminal, when the first gateway determines that the first gateway does not store the privacy profile of the target mobile terminal.

2. The location service system according to claim 1, wherein the first gateway is arranged to handle a periodicity of location requests and periodically transmits a location request to the second gateway.

3. The location service system according to claim 1, wherein the second gateway is arranged to handle a periodicity of location requests and periodically transmits a location request to the positioning system.

4. A location method for a location service system comprising the steps of:

transmitting, from a client terminal, a location request requesting a location of a target mobile terminal;
receiving, at a first gateway and a second gateway, the location request;
performing a privacy check on the received location request using privacy settings of the target mobile terminal;
sending a positioning request requesting the location of the target mobile terminal;
producing, in a positioning system, location information for the target mobile terminal in response to the positioning request; and
determining, at the first gateway receiving the location request, whether the first gateway stores a privacy profile of the target mobile terminal, and
sending the location request from the first gateway to the second gateway, which stores the privacy profile of the target mobile terminal, when the first gateway determines that the first gateway does not store the privacy profile of the target mobile terminal.

5. The method according to claim 4, further comprising the step of handling, at the first gateway, a periodicity of location requests and periodically transmitting a location request to the second gateway.

6. The method according to claim 4, further comprising the step of handling, at the second gateway, a periodicity of location requests and periodically transmitting a location request to the positioning system.

7. A location method for a gateway of a location service system comprising the steps at the gateway of:
receiving, at the gateway from a client terminal, a location request requesting a location of a target mobile terminal
performing, at the gateway, a privacy check on the received location request using privacy settings of the target mobile terminal;
sending from the gateway a positioning request requesting the location of the target mobile terminal;
producing, in a positioning system, location information for the target mobile terminal in response to the positioning request; and
determining, at the gateway receiving the location request, whether the gateway stores a privacy profile of the target mobile terminal, and
when the gateway determines that the gateway does not store the privacy profile of the target mobile terminal, sending the location request from the gateway to another gateway, which stores the privacy profile of the target mobile terminal.

8. The method according to claim 7, wherein the gateway handles a periodicity of location requests and periodically transmits a location request to the another gateway.

9. The method according to claim 7, wherein upon receiving the location request from a further gateway, which does not store the privacy profile of the target mobile terminal, the gateway handles a periodicity of location requests and periodically transmits a location request to the positioning system.

* * * * *